United States Patent
Pu

(10) Patent No.: US 12,487,767 B2
(45) Date of Patent: Dec. 2, 2025

(54) DATA ACCESS METHOD, STORAGE MEDIUM DRIVE, AND STORAGE DEVICE

(71) Applicant: Huawei Technologies Co., Ltd., Shenzhen (CN)

(72) Inventor: Guiyou Pu, Chengdu (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 118 days.

(21) Appl. No.: 17/857,519

(22) Filed: Jul. 5, 2022

(65) Prior Publication Data

US 2022/0334750 A1    Oct. 20, 2022

Related U.S. Application Data

(63) Continuation of application No. PCT/CN2020/114379, filed on Sep. 10, 2020.

(30) Foreign Application Priority Data

Jan. 6, 2020    (CN) .................. 202010011440.2
Mar. 17, 2020    (CN) .................. 202010185272.9

(51) Int. Cl.
G06F 3/06    (2006.01)

(52) U.S. Cl.
CPC .......... G06F 3/0652 (2013.01); G06F 3/0604 (2013.01); G06F 3/064 (2013.01); G06F 3/0674 (2013.01)

(58) Field of Classification Search
CPC ...... G06F 3/0652; G06F 3/0604; G06F 3/064; G06F 3/0674

USPC ........................................................ 711/111
See application file for complete search history.

(56) References Cited

U.S. PATENT DOCUMENTS

| | | | |
|---|---|---|---|
| 7,472,223 B1 * | 12/2008 | Ofer ................... | G11B 20/1883 714/6.32 |
| 8,949,255 B1 * | 2/2015 | Faibish .................. | G06F 16/14 707/755 |
| 2005/0223154 A1 * | 10/2005 | Uemura .............. | G06F 12/0223 711/112 |
| 2009/0172249 A1 * | 7/2009 | Matthews ........... | G06F 12/0888 711/E12.019 |
| 2011/0145305 A1 | 6/2011 | Kamei et al. | |

(Continued)

FOREIGN PATENT DOCUMENTS

| | | |
|---|---|---|
| CN | 102334106 A | 1/2012 |
| CN | 104182701 A | 12/2014 |

(Continued)

*Primary Examiner* — Gautam Sain
(74) *Attorney, Agent, or Firm* — Conley Rose, P.C.

(57) ABSTRACT

A hard disk includes a storage medium, an interface, and a processor. The storage medium is configured to provide a storage space including a plurality of logical units. Each logical unit internally stores data in an append-only write manner, a storage space corresponding to each logical unit comes from one or more erase blocks in the hard disk, and the erase block is a minimum erase unit of the hard disk. The interface is configured to provide a controller with a logical unit identifier, and receive a data access request that includes the logical unit identifier and that is sent by the controller. The processor is configured to search for a to-be-accessed storage space based on the logical unit identifier in the data access request.

18 Claims, 4 Drawing Sheets

(56) References Cited

U.S. PATENT DOCUMENTS

| | | | |
|---|---|---|---|
| 2013/0024460 A1 | 1/2013 | Peterson et al. | |
| 2013/0117503 A1* | 5/2013 | Nellans | G06F 12/0246 |
| | | | 711/103 |
| 2013/0191601 A1 | 7/2013 | Peterson et al. | |
| 2014/0297981 A1 | 10/2014 | Kameyama et al. | |
| 2014/0304560 A1* | 10/2014 | Narasimha | G06F 11/076 |
| | | | 714/704 |
| 2015/0120687 A1* | 4/2015 | Bhattacharjee | G06F 16/2343 |
| | | | 707/704 |
| 2017/0322882 A1 | 11/2017 | Peterson et al. | |
| 2018/0115788 A1* | 4/2018 | Burns | G06V 20/41 |
| 2018/0232154 A1 | 8/2018 | Matthew et al. | |
| 2018/0364942 A1* | 12/2018 | Goren | G06F 9/467 |
| 2019/0294379 A1 | 9/2019 | Xiong | |

FOREIGN PATENT DOCUMENTS

| | | |
|---|---|---|
| CN | 106708665 A | 5/2017 |
| CN | 107678981 A | 2/2018 |
| CN | 108228076 A | 6/2018 |
| CN | 110018966 A | 7/2019 |
| CN | 110750213 A | 2/2020 |

\* cited by examiner

DATA ACCESS METHOD, STORAGE MEDIUM DRIVE, AND STORAGE DEVICE

CROSS-REFERENCE TO RELATED APPLICATIONS

This is a continuation of International Patent Application No. PCT/CN2020/114379 filed on Sep. 10, 2020, which claims priority to Chinese Patent Application No. 202010011440.2 filed on Jan. 6, 2020 and Chinese Patent Application No. 202010185272.9 filed on Mar. 17, 2020. The disclosures of the aforementioned applications are hereby incorporated by reference in their entireties.

TECHNICAL FIELD

This disclosure relates to the field of computer technologies, and in particular, to a data access method, a hard disk, and a storage device.

BACKGROUND

A storage device includes a controller and a hard disk that are connected. The controller is configured to control the hard disk to store and access data in the hard disk.

In a related technology, when the controller needs to store data A in a specific storage space in the hard disk, the controller may send a request to the hard disk such that the hard disk can store the data A in the storage space based on the request. When the controller needs to access the data A stored in the hard disk, the controller may send a request to the hard disk such that the hard disk can search for the data A based on the request.

However, a data storage manner and a data access manner for the storage device are relatively single.

SUMMARY

This disclosure provides a data access method, a hard disk, and a storage device, to resolve a problem that a data storage manner and a data access manner for a storage device are relatively single. The technical solution is as follows.

According to a first aspect, a hard disk is provided. The hard disk includes a storage medium, an interface, and a processor. The storage medium is configured to provide a storage space, where the storage space includes a plurality of logical units, each logical unit has a logical unit identifier, and the logical units have different logical unit identifiers. The interface is configured to communicate with a controller, and provide the controller with the logical unit identifier. The interface is further configured to receive a data access request that includes the logical unit identifier and that is sent by the controller. The processor is configured to search for a to-be-accessed storage space based on the logical unit identifier in the data access request.

Each logical unit internally stores data in an append-only write manner, a storage space corresponding to each logical unit comes from one or more erase blocks in the hard disk, and the erase block is a minimum erase unit of the hard disk. It can be learned that a manner in which the hard disk stores data in this disclosure is different from a manner in which a hard disk stores data in a related technology. According to the logical unit provided by the hard disk in this disclosure, the controller can send the access request for the data in the logical unit to the hard disk by using the logical unit identifier such as to implement data access. It can be learned that a manner of accessing data in the hard disk in this disclosure is different from a manner of accessing data in the hard disk in the related technology.

In addition, because the logical unit internally stores data in the append-only write manner, each time the hard disk stores data, the hard disk stores the data in an idle storage space. Therefore, each data storage process does not change stored historical data. In this way, even if the hard disk processes data in a specific storage space for a plurality of times, because the data in the storage space does not change, a plurality of processing results are consistent. This avoids a case in which a plurality of processing results obtained by processing data in a specific storage space are inconsistent because newly stored data replaces historical data when data is stored in the hard disk for a plurality of times by using the data storage manner in the related technology.

Optionally, the interface is further configured to receive a data deletion request that includes the logical unit identifier and that is sent by the controller, the processor is further configured to search for a storage space of to-be-deleted data based on the logical unit identifier in the data deletion request, and when all data in the storage space of the to-be-deleted data is stopped being processed, delete the data in the storage space of the to-be-deleted data, and the interface is further configured to send a data deletion response to the controller, where the data deletion response includes the logical unit identifier.

It may be learned that the hard disk provided in this disclosure can delete data using a logical unit as a unit. In addition, when the hard disk deletes data in a specific logical unit, it needs to be ensured that all data in the logical unit is stopped being processed such as to avoid a case in which the data is still being processed when the data in the logical unit is deleted. If specific data is still being processed when the data is deleted, a data processing result is different from a real result, and accuracy of the data processing result is affected. Because data is stopped being processed when the hard disk in this disclosure deletes the data, accuracy of a data processing result is not affected.

Optionally, the storage medium is further configured to store metadata of data, and the interface has a metadata semantic meaning, and is further configured to provide the controller with the metadata. The metadata includes one or more attributes of the data. For example, when the data is a video, the metadata of the data may include a time attribute (used to indicate a shooting time of the video) and an address attribute (used to indicate a shooting address of the video) of the video. Both the metadata and the data may be stored in the logical unit. Certainly, the metadata may alternatively be stored in a storage space outside the logical unit. A metadata storage manner is not limited in this disclosure. In a case in which the storage medium can be configured to store the metadata, the interface in the hard disk has a metadata semantic meaning, and the interface is further configured to provide the controller with the metadata. Because the interface has the metadata semantic meaning, the hard disk can perform metadata-related interaction with the controller based on the metadata semantic meaning.

Optionally, the interface is further configured to receive a data processing request sent by the controller, where the data processing request includes the logical unit identifier and at least one attribute included in the metadata, and the processor is configured to search for the storage space based on the logical unit identifier, and perform screening or processing on data in the found storage space based on the at least one attribute carried in the data processing request. For example, the storage space searched by the processor in the hard disk based on the logical unit identifier in the data processing request is a storage space 1 corresponding to a logical unit 1. If the processing request includes an attribute 1 included in the metadata, the processor may obtain, through screening based on the attribute 1, data having the attribute 1 from data stored in the storage space 1, or the processor may further process the data having the attribute 1.

Optionally, the interface is further configured to provide the controller with a data storage space offset of the logical unit, where the data access request further includes the offset, and when searching for the to-be-accessed storage space based on the logical unit identifier in the data access request, the processor is further configured to search for the to-be-accessed storage space based on the logical unit identifier and the offset in the data access request.

According to a second aspect, a storage device is provided. The storage device includes a hard disk and a controller. The hard disk is configured to provide a storage space, where the storage space includes a plurality of logical units, each logical unit has a logical unit identifier, the logical units have different logical unit identifiers, each logical unit internally stores data in an append-only write manner, a storage space corresponding to each logical unit comes from one or more erase blocks in the hard disk, and the erase block is a minimum erase unit of the hard disk. The hard disk is further configured to communicate with the controller, and provide the controller with the logical unit identifier. The controller is configured to send a data access request to the hard disk, where the data access request includes the logical unit identifier. The hard disk is configured to search for a to-be-accessed storage space based on the logical unit identifier in the data access request.

Optionally, the controller is further configured to send a data deletion request to the hard disk, where the data deletion request includes the logical unit identifier, and the hard disk is further configured to search for a storage space of to-be-deleted data based on the logical unit identifier in the data deletion request, and when all data in the storage space of the to-be-deleted data is stopped being processed, delete the data in the storage space of the to-be-deleted data, and send a data deletion response to the controller, where the data deletion response includes the logical unit identifier.

Optionally, the hard disk is further configured to store metadata of data, and the hard disk further has a metadata semantic meaning, and is further configured to provide the controller with the metadata.

Optionally, the controller is further configured to send a data processing request to the hard disk, where the data processing request includes the logical unit identifier and at least one attribute included in the metadata, and the hard disk is further configured to search for the storage space based on the logical unit identifier, and perform screening or processing on data in the found storage space based on the at least one attribute carried in the data processing request.

Optionally, the hard disk is further configured to provide the controller with a data storage space offset of the logical unit, where the data access request further includes the offset, and when searching for the to-be-accessed storage space based on the logical unit identifier in the data access request, the hard disk is further configured to search for the to-be-accessed storage space based on the logical unit identifier and the offset in the data access request.

According to a third aspect, a data access method is provided. The method is applied to a storage device including a hard disk and a controller. The hard disk is configured to provide a storage space, where the storage space includes a plurality of logical units, each logical unit has a logical unit identifier, the logical units have different logical unit identifiers, each logical unit internally stores data in an append-only write manner, a storage space corresponding to each logical unit comes from one or more erase blocks in the hard disk, and the erase block is a minimum erase unit of the hard disk. The method includes that the hard disk provides the controller with the logical unit identifier, the controller sends a data access request to the hard disk, where the data access request includes the logical unit identifier, and the hard disk searches for a to-be-accessed storage space based on the logical unit identifier in the data access request.

Optionally, the method further includes that the controller sends a data deletion request to the hard disk, where the data deletion request includes the logical unit identifier, the hard disk searches for a storage space of to-be-deleted data based on the logical unit identifier in the data deletion request, when all data in the storage space of the to-be-deleted data is stopped being processed, the hard disk deletes the data in the storage space of the to-be-deleted data, and the hard disk sends a data deletion response to the controller, where the data deletion response includes the logical unit identifier.

Optionally, the hard disk is further configured to store metadata of data, where the metadata includes one or more attributes of the data. The hard disk has a metadata semantic meaning. The method further includes that the hard disk provides the controller with the metadata.

Optionally, the method further includes that the controller sends a data processing request to the hard disk, where the data processing request includes the logical unit identifier and at least one attribute included in the metadata, and the hard disk searches for the storage space based on the logical unit identifier, and performs screening or processing on data in the found storage space based on the at least one attribute carried in the data processing request.

Optionally, before the controller sends the data access request to the hard disk, the method further includes that the hard disk provides the controller with a data storage space offset of the logical unit, where the data access request further includes the offset. The hard disk searches for a to-be-accessed storage space based on the logical unit identifier in the data access request includes that the hard disk searches for the to-be-accessed storage space based on the logical unit identifier and the offset in the data access request.

For beneficial effects of the second aspect and the third aspect, refer to beneficial effects of the first aspect. Details are not described in this disclosure again.

DETAILED DESCRIPTION OF EMBODIMENTS

To make principles, technical solutions, and advantages of this disclosure clearer, the following further describes implementations of this disclosure in detail with reference to accompanying drawings.

Figure 1:
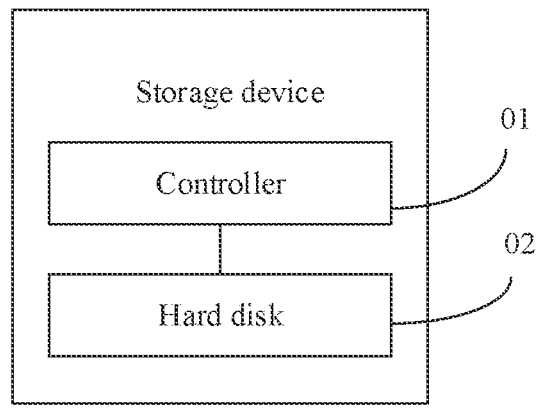
FIG. 1 is a schematic diagram of a structure of a storage device according to an embodiment of this disclosure.

FIG. 1 is a schematic diagram of a structure of a storage device according to an embodiment of this disclosure. The storage device may be any electronic device having a storage function, for example, a storage array or a server. As shown in FIG. 1, the storage device includes a controller 01 and a hard disk 02.

The controller 01 is connected to the hard disk 02. In addition, the controller 01 and the hard disk 02 can communicate with each other based on the connection. For example, a protocol used when the controller 01 communicates with the hard disk 02 may be a non-volatile memory express (NVMe) protocol or a serial attached small computer system interface (SAS) protocol. The hard disk 02 may be located outside the controller 01. Certainly, the hard disk 02 may alternatively be located inside the controller 01. This is not limited in this embodiment of this disclosure.

Figure 2:
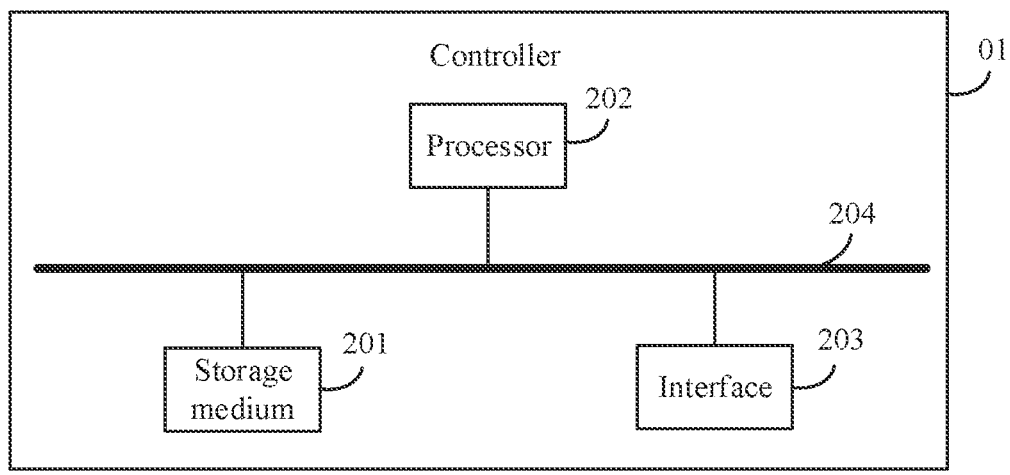
FIG. 2 is a schematic diagram of a structure of a controller according to an embodiment of this disclosure.

FIG. 2 is a schematic diagram of a structure of a controller according to an embodiment of this disclosure. As shown in FIG. 2, the controller 01 includes a storage medium 201, a processor 202, and an interface 203. The storage medium 201 is configured to store a program. The processor 202 is configured to invoke the program stored in the storage medium 201 such that the controller performs a corresponding method or function. The interface 203 is configured to communicate with another apparatus (for example, the hard disk 02) under control of the processor 202. Optionally, as shown in FIG. 2, the controller 01 may further include a bus 204. The storage medium 201, the processor 202, and the interface 203 are communicatively connected through the bus 204. The processor 202 may invoke, through the bus 204, the program stored in the storage medium 201.

Figure 3:
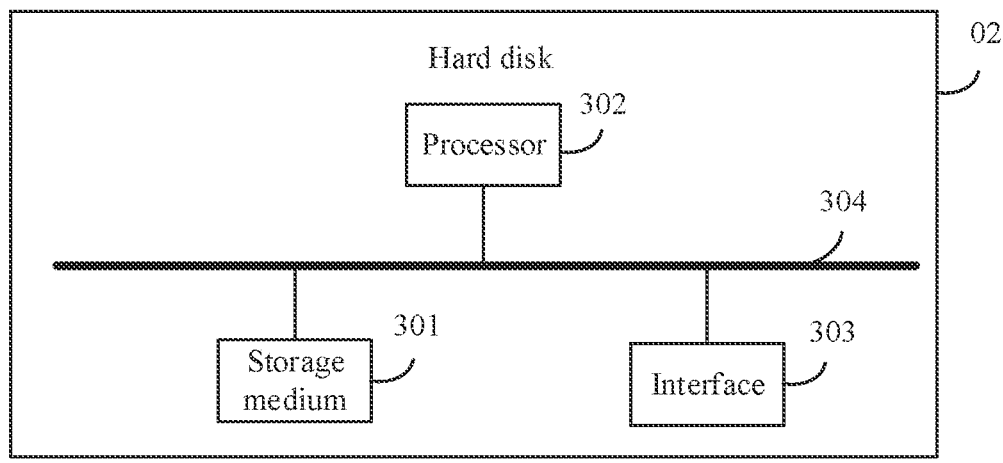
FIG. 3 is a schematic diagram of a structure of a hard disk according to an embodiment of this disclosure.

FIG. 3 is a schematic diagram of a structure of a hard disk according to an embodiment of this disclosure. As shown in FIG. 3, the hard disk 02 includes a storage medium 301, a processor 302, and an interface 303. The storage medium 301 is configured to store a program, data, and the like. The processor 302 is configured to invoke the program stored in the storage medium 301 such that the hard disk performs a corresponding method or function. The interface 303 is configured to communicate with another apparatus (for example, the controller 01) under control of the processor 302. Optionally, as shown in FIG. 3, the hard disk 02 may further include a bus 304. The storage medium 301, the processor 302, and the interface 303 are communicatively connected through the bus 304. The processor 302 may invoke, through the bus 304, the program stored in the storage medium 301. The hard disk may be any apparatus having a storage function, for example, a storage disk, a storage array, or a smart disk enclosure. The storage disk may be a solid-state drive (SSD), a storage class memory (SCM), or the like.

Optionally, there may be one or more controllers 01 and one or more hard disks 02 (for example, the foregoing structure including the processor, the storage medium, the interface, and the bus). In FIG. 2 and FIG. 3, an example in which one controller and one hard disk is used. This is not limited in this embodiment of this disclosure.

In the storage device, the controller 01 is configured to control the hard disk 02 to perform operations such as storage, access, deletion, and processing on data in the hard disk 02.

In a related technology, when the controller 01 needs to store data A in the hard disk 02, the controller 01 may send a request to the hard disk 02, where the request carries an address of a specific storage space (which is referred to as a storage space 1) such that the hard disk 02 can store the data A in the storage space 1 based on the request. When the controller 01 needs to change the previously stored data A to data A', the controller 01 may send a request to the hard disk 02 again, where the request carries the address of the storage space 1 such that the hard disk 02 stores the data A' in the storage space based on the request, and overwrites the original data A in the storage space. When the controller needs to access the data A stored in the hard disk, the controller may send a request to the hard disk such that the hard disk can search for the data A based on the request.

However, a data storage manner and a data access manner for the storage device are relatively single.

In addition, in the related technology, the controller 01 may further control the hard disk 02 to process data stored in the hard disk 02, and the hard disk 02 may further feed back a processing result to the controller 01. However, in the related technology, in a process in which the controller 01 controls the hard disk 02 to process data in the storage space 1 for a plurality of times, the hard disk 02 may change the data in the storage space 1 from the data A to the data A' under control of the controller 01. In this case, because data processed in the foregoing plurality of processing processes performed by the hard disk is inconsistent, a plurality of processing results obtained after the hard disk 02 processes the data in the storage space 1 are inconsistent.

In addition, in the related technology, when the hard disk 02 deletes specific data, if the data is still being processed, a processing result obtained after the hard disk processes the data is inconsistent with a real result, and accuracy of the processing result is affected.

A function of the storage device provided in this embodiment of this disclosure is different from a function of a storage device in the related technology such that a data storage manner and a data access manner for the storage device provided in this embodiment of this disclosure are relatively rich, and a problem that results obtained after the hard disk processes data for a plurality of times are inconsistent and accuracy of the processing results is relatively low can be further resolved.

Figure 4:
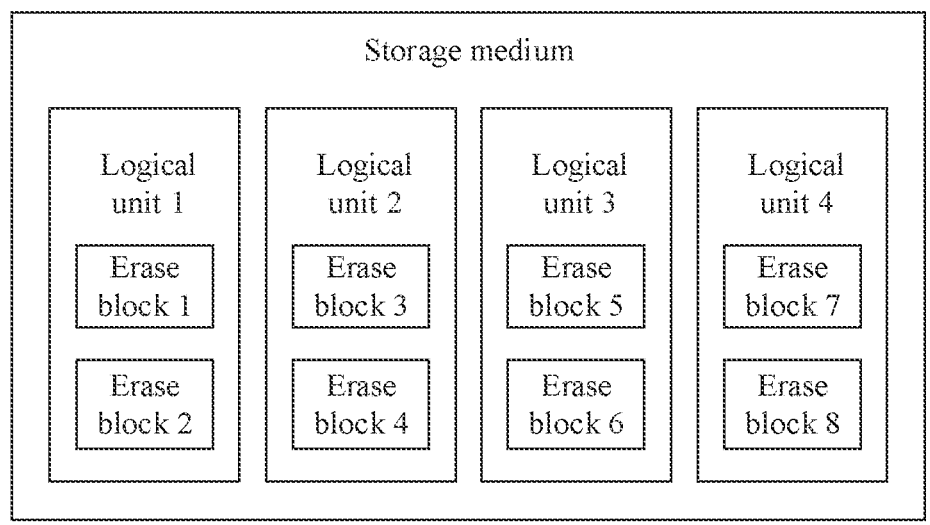
FIG. 4 is a schematic diagram of a storage space provided by a storage medium in a hard disk according to an embodiment of this disclosure.

For example, in the storage device provided in this embodiment of this disclosure, the storage medium (301 in FIG. 3) in the hard disk is configured to provide a storage space, where the storage space includes a plurality of logical units, each logical unit has a logical unit identifier, and the logical units have different logical unit identifiers. Each logical unit internally stores data in an append-only write manner, a storage space corresponding to each logical unit comes from one or more erase blocks in the hard disk, and the erase block is a minimum erase unit of the hard disk FIG. 4 is a schematic diagram of a storage space provided by a storage medium in a hard disk according to an embodiment of this disclosure. In FIG. 4, an example in which the storage space includes four logical units (1, 2, 3, and 4) is used. A storage space corresponding to the logical unit 1 comes from erase blocks 1 and 2 in the hard disk, a storage space corresponding to the logical unit 2 comes from erase blocks 3 and 4 in the hard disk, a storage space corresponding to the logical unit 3 comes from erase blocks 5 and 6 in the hard disk, and a storage space corresponding to the logical unit 4 comes from erase blocks 7 and 8 in the hard disk.

Optionally, a quantity of erase blocks corresponding to a logical unit may be an integer, or may not be an integer. In this embodiment of this disclosure, an example in which the quantity of erase blocks corresponding to the logical unit is an integer is used. When the quantity of erase blocks corresponding to the logical unit is not an integer, there is a specific erase block simultaneously corresponding to a plurality of logical units in these erase blocks.

Further, the interface (303 in FIG. 3) in the hard disk provided in this embodiment of this disclosure is configured to communicate with the controller, and provide the controller with the foregoing logical unit identifier. In this way, the controller can obtain the logical unit identifier in the hard disk such that the controller accesses the data in the hard disk based on the logical unit identifier. For example, when the controller needs to access data in a logical unit having a logical unit identifier, the controller may send a data access request including the logical unit identifier to the hard disk. The interface in the hard disk may be configured to receive the data access request sent by the controller. Then the processor (302 in FIG. 3) in the hard disk may be configured to search for a to-be-accessed storage space of the controller based on the logical unit identifier in the data access request.

It may be learned that the hard disk provided in this embodiment of this disclosure can provide a logical unit that internally stores data in an append-only write manner, and a storage space corresponding to the logical unit comes from one or more erase blocks in the hard disk. It can be learned that a manner in which the hard disk stores data in this embodiment of this disclosure is different from a manner in which a hard disk stores data in the related technology. According to the logical unit provided by the hard disk in this embodiment of this disclosure, the controller can send the access request for the data in the logical unit to the hard disk by using the logical unit identifier such as to implement data access. It can be learned that a manner of accessing data in the hard disk in this embodiment of this disclosure is different from a manner of accessing data in the hard disk in the related technology.

In addition, because the logical unit internally stores data in the append-only write manner, each time the hard disk stores data, the hard disk stores the data in an idle storage space. Therefore, each data storage process does not change stored historical data. In this way, even if the hard disk processes data in a specific storage space for a plurality of times, because the data in the storage space does not change, a plurality of processing results are consistent. This avoids a case in which a plurality of processing results obtained by processing data in a specific storage space are inconsistent because newly stored data replaces historical data when data is stored in the hard disk for a plurality of times by using the data storage manner in the related technology.

Optionally, the interface in the hard disk is further configured to provide the controller with a data storage space offset of the logical unit. In this case, the data access request sent by the controller further includes the offset. When searching for the to-be-accessed storage space based on the logical unit identifier in the data access request, the processor in the hard disk may search for the to-be-accessed storage space based on the logical unit identifier and the offset in the data access request.

The interface (303 in FIG. 3) in the hard disk provided in this embodiment of this disclosure is further configured to receive a data deletion request sent by the controller, where the data deletion request includes the logical unit identifier. The processor (302 in FIG. 3) in the hard disk is further configured to search for a storage space of to-be-deleted data based on the logical unit identifier in the data deletion request, and when all data in the storage space of the to-be-deleted data is stopped being processed, delete the data in the storage space of the to-be-deleted data. The interface in the hard disk is further configured to send a data deletion response to the controller, where the data deletion response includes the logical unit identifier.

It may be learned that the hard disk provided in this embodiment of this disclosure can delete data by using a logical unit as a unit. In addition, when the hard disk deletes data in a specific logical unit, it needs to be ensured that all data in the logical unit is stopped being processed such as to avoid a case in which the data is still being processed when the data in the logical unit is deleted. If specific data is still being processed when the data is deleted, a data processing result is different from a real result, and accuracy of the data processing result is affected. Because data is stopped being processed when the hard disk in this embodiment of this disclosure deletes the data, accuracy of a data processing result is not affected.

In this embodiment of this disclosure, when the processor in the hard disk deletes data in a specific logical unit, if the data in the logical unit is not stopped being processed, the processor may wait until the data is stopped being processed, and then delete the data in the logical unit. Alternatively, because the data in the logical unit is not stopped being processed currently, the processor may determine that a condition for deleting the data in the logical unit is not met currently. In this case, the processor may not perform an operation of deleting the data in the logical unit. In addition, the interface in the hard disk may further send a deletion failure response including the logical unit identifier to the controller such as to indicate the fact that the data in the logical unit that is indicated by the logical unit identifier fails to be deleted to the controller.

Optionally, the storage medium (301 in FIG. 3) in the hard disk provided in this embodiment of this disclosure is further configured to store metadata of data. The metadata includes one or more attributes of the data. For example, when the data is a video, the metadata of the data may include a time attribute (used to indicate a shooting time of the video) and an address attribute (used to indicate a shooting address of the video) of the video. Both the metadata and the data may be stored in the logical unit. Certainly, the metadata may alternatively be stored in a storage space outside the logical unit. A metadata storage manner is not limited in this embodiment of this disclosure. In a case in which the storage medium can be configured to store the metadata, the interface in the hard disk has a metadata semantic meaning, and the interface is further configured to provide the controller with the metadata. Because the interface has the metadata semantic meaning, the hard disk can perform metadata-related interaction with the controller based on the metadata semantic meaning.

Optionally, the interface in the hard disk is further configured to receive a data processing request sent by the controller, where the data processing request includes the logical unit identifier and at least one attribute included in the metadata. The processor in the hard disk is configured to search for the storage space based on the logical unit identifier in the data processing request, and perform screening or processing on data in the found storage space based on the at least one attribute in the data processing request. For example, the storage space searched by the processor in the hard disk based on the logical unit identifier in the data processing request is the storage space 1 corresponding to the logical unit 1. If the processing request includes an attribute 1 included in the metadata, the processor may obtain, through screening based on the attribute 1, data having the attribute 1 from data stored in the storage space 1, or the processor may further process the data having the attribute 1.

The foregoing describes functions of the storage device provided in this embodiment of this disclosure. The following further describes the functions of the storage device provided in this embodiments of this disclosure with reference to a data access method provided in the embodiments of this disclosure.

Figure 5:
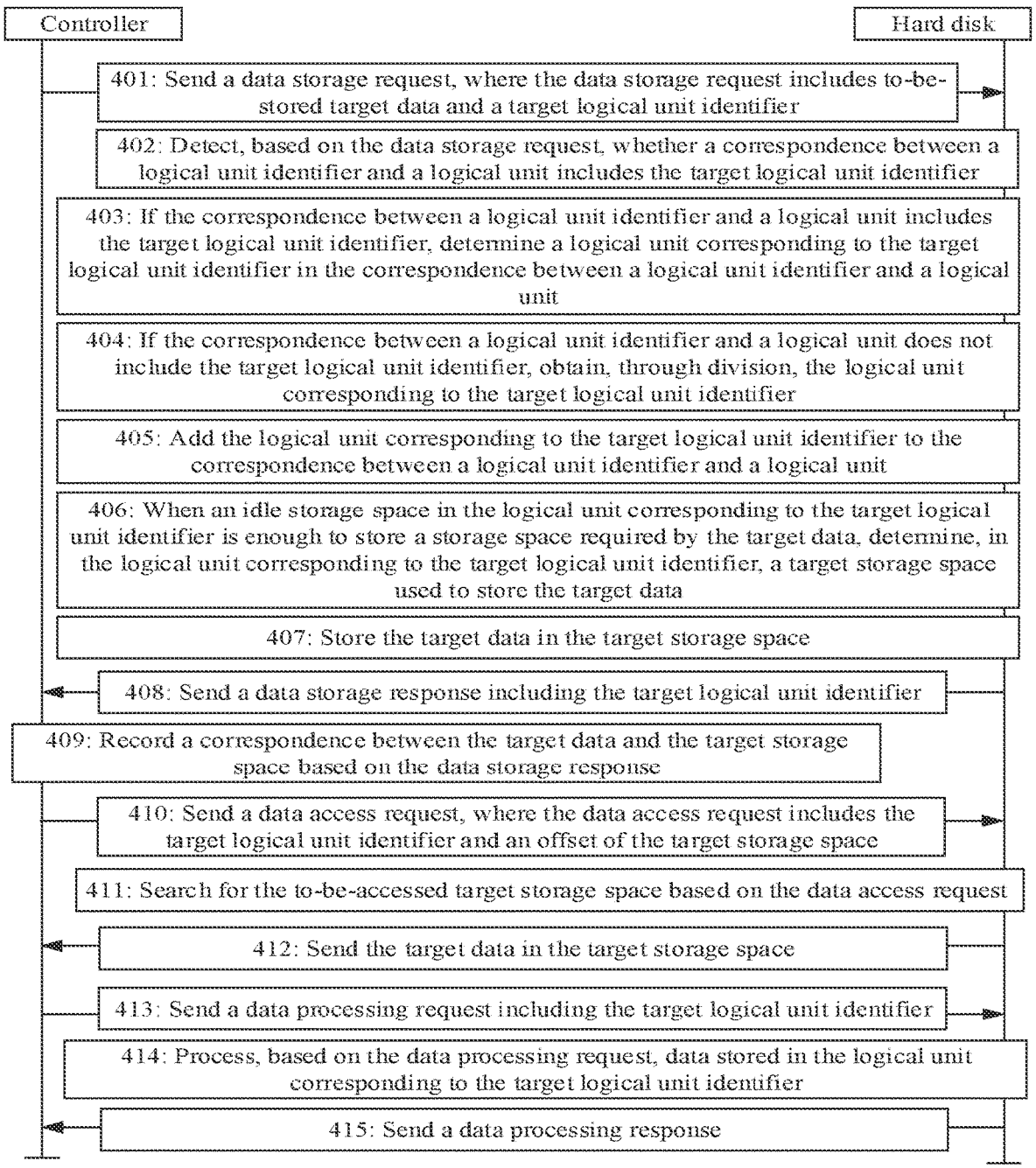
FIG. 5 is a flowchart of a data access method according to an embodiment of this disclosure.

For example, FIG. 5 is a flowchart of a data access method according to an embodiment of this disclosure. As shown in FIG. 5, the data access method may include the following steps.

Step 401: A controller sends a data storage request to a hard disk, where the data storage request includes to-be-stored target data and a target logical unit identifier.

Optionally, when the controller needs to store the target data in the hard disk, the controller first needs to allocate a logical unit identifier (which is referred to as the target logical unit identifier) to the target data, add both the target data and the target logical unit identifier allocated to the target data to the data storage request, and send the data storage request to the hard disk.

The target logical unit identifier allocated by the controller to the target data may be used to identify a logical unit provided by a storage medium in the hard disk. In this embodiment of this disclosure, an example in which a logical unit in the hard disk is not obtained through division in advance is used. In step 401, the controller may generate the foregoing target logical unit identifier for the target data. Therefore, after receiving the data storage request, the hard disk obtains, through division in the storage medium, the logical unit that is identified by the target logical unit identifier.

In this embodiment of this disclosure, the logical unit identifier may be an identity document, another number, or the like. Logical unit identifiers in different data storage requests delivered by the controller may be the same or may be different. This is not limited in this embodiment of this disclosure. When a logical unit identifier is implemented in a manner of a number, if a relatively large quantity of different logical unit identifiers need to be used, a relatively long logical unit identifier may be set, and these different logical unit identifiers may be implemented in a manner of increasing numbers.

Step 402: The hard disk detects, based on the data storage request, whether a correspondence between a logical unit identifier and a logical unit includes the target logical unit identifier. If the correspondence between a logical unit identifier and a logical unit includes the target logical unit identifier, the hard disk performs step 403, or if the correspondence between a logical unit identifier and a logical unit does not include the target logical unit identifier, the hard disk performs step 404.

In this embodiment of this disclosure, in the correspondence between a logical unit identifier and a logical unit, each logical unit identifier is used to identify a logical unit corresponding to the logical unit identifier in the storage medium in the hard disk. Each logical unit provided by the hard disk and the logical unit identifier corresponding to the logical unit both are recorded in the correspondence. When a logical unit is not obtained through division in the hard disk, the correspondence is null, in other words, no logical unit is recorded. When at least one logical unit corresponding to a determined logical unit identifier exists in the hard disk, the correspondence can record the at least one logical unit and the logical unit identifier corresponding to the at least one logical unit.

The foregoing correspondence between a logical unit identifier and a logical unit may be stored in the hard disk, or may be stored in another apparatus and the hard disk can read and write the correspondence. This is not limited in this embodiment of this disclosure.

In step 402, the hard disk needs to compare the target logical unit identifier in the data storage request with a logical unit identifier in the correspondence such as to determine whether the correspondence includes the target logical unit identifier.

For example, assuming that the foregoing correspondence between a logical unit identifier and a logical unit is shown in Table 1, it may be learned that logical units obtained through division in the hard disk include a logical unit 1.1, a logical unit 1.2, a logical unit 1.3, and a logical unit 1.4. The logical unit 1.1 corresponds to a logical unit identifier 100, the logical unit 1.2 corresponds to a logical unit identifier 101, the logical unit 1.3 corresponds to a logical unit identifier 102, and the logical unit 1.4 corresponds to a logical unit identifier 103.

If the target logical unit identifier is the logical unit identifier 100, after comparing the target logical unit identifier with a logical unit identifier in the correspondence, the hard disk may determine that the correspondence includes the target logical unit identifier. In this case, the hard disk may perform step 403. If the target logical unit identifier is a logical unit identifier 104, after comparing the target logical unit identifier with a logical unit identifier in the correspondence, the hard disk may determine that the correspondence does not include the target logical unit identifier. In this case, the hard disk may perform step 404.

TABLE 1

| Logical unit identifier | Logical unit |
|---|---|
| 100 | 1.1 |
| 101 | 1.2 |
| 102 | 1.3 |
| 103 | 1.4 |

Step 403: The hard disk determines the logical unit corresponding to the target logical unit identifier in the correspondence between a logical unit identifier and a logical unit, and then performs step 406.

When the foregoing correspondence between a logical unit identifier and a logical unit includes the target logical unit identifier, it indicates that the logical unit corresponding to the target logical unit identifier is already obtained through division in the hard disk. Therefore, the hard disk may directly determine the logical unit corresponding to the target logical unit identifier in the correspondence.

Table 1 is used as an example. If the target logical unit identifier is the logical unit identifier 100, the hard disk may determine that the logical unit 1.1 is the logical unit corresponding to the target logical unit identifier.

Step 404: The hard disk obtains, through division, the logical unit corresponding to the target logical unit identifier, and then performs step 405.

When the foregoing correspondence between a logical unit identifier and a logical unit does not include the target logical unit identifier, it indicates that the logical unit corresponding to the target logical unit identifier is not obtained through division in the hard disk. Therefore, the hard disk needs to obtain, through division in an idle storage space that is not divided into logical units, the logical unit corresponding to the target logical unit identifier.

Table 1 is still used as an example. If the target logical unit identifier is the logical unit identifier 104, the hard disk may determine that the foregoing correspondence does not include the logical unit identifier 104. In this case, the hard disk may obtain one or more erase blocks through screening in the idle storage space that is not divided into logical units, and use the one or more erase blocks as the logical unit 1.5 corresponding to the target logical unit identifier.

Step 405: The hard disk adds the logical unit corresponding to the target logical unit identifier to the correspondence between a logical unit identifier and a logical unit, and then performs step 406.

After determining the logical unit corresponding to the target logical unit identifier, the hard disk may add the logical unit corresponding to the target logical unit identifier to the foregoing correspondence such as to update the foregoing correspondence.

Table 1 is still used as an example. The hard disk may add both the target logical unit identifier 104 and the logical unit 1.5 to Table 1 such as to obtain a correspondence between a logical unit identifier and a logical unit shown in Table 2.

TABLE 2

| Logical unit identifier | Logical unit |
|---|---|
| 100 | 1.1 |
| 101 | 1.2 |
| 102 | 1.3 |
| 103 | 1.4 |
| 104 | 1.5 |

Step 406: When an idle storage space in the logical unit corresponding to the target logical unit identifier is enough to store a storage space required by the target data, the hard disk determines, in the logical unit corresponding to the target logical unit identifier, a target storage space used to store the target data.

After determining the logical unit corresponding to the target logical unit identifier, the hard disk may store the target data in the logical unit. Because the logical unit in the hard disk stores data in an append-only write manner, the hard disk may first determine whether the idle storage space in the logical unit corresponding to the target logical unit identifier is enough to store the foregoing target data. When the idle storage space in the logical unit corresponding to the target logical unit identifier is greater than or equal to the storage space required for storing the target data, the hard disk may determine that the idle storage space in the logical unit corresponding to the target logical unit identifier is enough to store the foregoing target data. In this case, the hard disk may further determine, in the idle storage space in the logical unit corresponding to the target logical unit identifier, the target storage space (the idle storage space) used to store the target data. The target storage space may be a part of storage space (for example, some erase blocks) or the entire storage space (for example, all erase blocks) in the logical unit corresponding to the target logical unit identifier. This is not limited in this embodiment of this disclosure.

For example, when determining the target storage space in the idle storage space in the logical unit corresponding to the target logical unit identifier, the hard disk may select the target storage space in a manner of increasing an offset. The offset is an offset of a start address of the target storage space relative to a start address of the logical unit corresponding to the target logical unit identifier. For example, it is assumed that the logical unit corresponding to the target logical unit identifier is a storage space ranging from an address 100 to an address 200. If the storage space in the logical unit corresponding to the target logical unit identifier is idle, the start address of the target storage space selected by the hard disk in step 406 may be 100. If the idle storage space in the logical unit corresponding to the target logical unit identifier is a storage space ranging from the address 110 to the address 200, the start address of the target storage space selected by the hard disk in step 406 may be 110. Certainly, the hard disk may not select the target storage space in a manner of increasing an offset. This is not limited in this embodiment of this disclosure.

Optionally, because the logical unit in the hard disk internally stores data in an append-only write manner, the target storage space is an idle storage space in the hard disk, in other words, the target storage space is a storage space in which data is not stored in the hard disk. It can be learned that, in this embodiment of this disclosure, when the hard disk stores the target data, an idle storage space is found to store the target data. Even if the target data needs to be used to replace specific historical data, the target data does not replace the historical data. After the target data is successfully stored, the historical data is still stored in the hard disk.

Step 407: The hard disk stores the target data in the target storage space.

After determining the target storage space, the hard disk may store the target data in the target storage space.

Step 408: The hard disk sends a data storage response including the target logical unit identifier to the controller.

Optionally, the data storage response may include not only the target logical unit identifier but also indication information of a location of the target storage space in the logical unit corresponding to the target logical unit identifier. Optionally, the indication information of the location includes a size of the target storage space and the offset of the start address of the target storage space relative to the start address of the logical unit corresponding to the target logical unit identifier.

For example, it is assumed that the start address of the logical unit corresponding to the target logical unit identifier is 100 and an end address is 200, and the start address of the target storage space is 110 and an end address is 120. In this case, the indication information of the location may include an offset 10 and a size 10 of the target storage space.

Step 409: The controller records a correspondence between the target data and the target storage space based on the data storage response.

After successfully storing data in the hard disk, the controller records a correspondence between the data and a storage space such as to subsequently invoke the data based on the storage space in the correspondence. The controller may record a correspondence between an identifier of the target data and the indication information of the target storage space such as to achieve an objective of recording the correspondence between the target data and the target storage space.

Optionally, the indication information of the target storage space may include the target logical unit identifier and the indication information of the location (including the offset and the size of the storage space). The controller may record a correspondence between the identifier of the target data, the target logical unit identifier, and the indication information of the location such as to achieve an objective of recording the correspondence between the target data and the target storage space.

For example, it is assumed that, before step 401, the controller stores data whose identifier is 1, data whose identifier is 2, data whose identifier is 3, and data whose identifier is 4 in total in the hard disk, and a correspondence between the four pieces of data and a logical unit is shown in Table 3. In this case, in step 409, as shown in Table 4, the controller may add, based on the data storage response for storing the target data (assuming that the identifier is 5), a correspondence between the data whose identifier is 5 and the indication information of the target storage space to Table 3, and the indication information of the target storage space includes the target logical unit identifier 104, the offset 10, and the size 10 of the storage space.

TABLE 3

| Data identifier | Logical unit identifier | Offset | Size of a storage space |
| --- | --- | --- | --- |
| 1 | 100 | 10 | 10 |
| 2 | 100 | 20 | 10 |
| 3 | 101 | 10 | 20 |
| 4 | 102 | 20 | 20 |

TABLE 4

| Data identifier | Logical unit identifier | Offset | Size of a storage space |
| --- | --- | --- | --- |
| 1 | 100 | 10 | 10 |
| 2 | 100 | 20 | 10 |
| 3 | 101 | 10 | 20 |
| 4 | 102 | 20 | 20 |
| 5 | 104 | 10 | 10 |

Step 410: The controller sends a data access request to the hard disk, where the data access request includes the target logical unit identifier and the offset of the target storage space.

After storing the target data in the hard disk, the controller may send the data access request to the hard disk based on information about the target data in the hard disk such as to implement subsequent access to the target data. For example, the data access request needs to include information about target data that needs to be accessed by the controller, for example, an identifier of a logical unit in which the target data is located (for example, the foregoing target logical unit identifier) and an offset of a target storage space in which the target data is located. Optionally, the data access request may further include the size of the target storage space in which the target data is located.

Step 411: The hard disk searches for the to-be-accessed target storage space based on the data access request.

Optionally, the hard disk may search for the to-be-accessed target storage space based on the target logical unit identifier, the offset, and the size of the target storage space in the data access request. For example, the hard disk may first find, based on the target logical unit identifier, the logical unit corresponding to the target logical unit identifier, and then find the target storage space in the logical unit based on the offset and the size of the target storage space.

Step 412: The hard disk sends the target data in the target storage space to the controller.

After finding the target storage space based on the data access request, the hard disk may send data (the target data) in the target storage space to the controller such that the controller can access the target data.

Step 413: The controller sends a data processing request including the target logical unit identifier to the hard disk.

The controller may send a data processing request to the hard disk when the hard disk needs to be controlled to process data stored in a specific logical unit. For example, the controller may query a recorded correspondence between data and a logical unit identifier, find a logical unit identifier (for example, the foregoing target logical unit identifier) corresponding to data that needs to be processed, and add the target logical unit identifier to the foregoing data processing request.

Step 414: The hard disk processes, based on the data processing request, data stored in the logical unit corresponding to the target logical unit identifier.

After receiving the foregoing data processing request, the hard disk may find the corresponding logical unit based on the target logical unit identifier in the data processing request, and process the data stored in the logical unit.

Step 415: The hard disk sends a data processing response to the controller.

After processing, based on the data processing request, the data in the corresponding logical unit that is found for the target logical unit identifier, the hard disk may add an obtained processing result to the data processing response and feed back the data processing response to the controller.

In this embodiment of this disclosure, a process of storing, accessing, and processing the target data is used as an example. For a process of storing, accessing, and processing other data, refer to the process of storing, accessing, and processing the target data. Details are not described herein again in this embodiment of this disclosure.

In conclusion, the hard disk provided in this embodiment of this disclosure can provide a logical unit that internally stores data in an append-only write manner, and a storage space corresponding to the logical unit comes from one or more erase blocks in the hard disk. It can be learned that a manner in which the hard disk stores data in this embodiment of this disclosure is different from a manner in which a hard disk stores data in a related technology. According to the logical unit provided by the hard disk in this embodiment of this disclosure, the controller can send the access request for the data in the logical unit to the hard disk using the logical unit identifier such as to implement data access. It can be learned that a manner of accessing data in the hard disk in this embodiment of this disclosure is different from a manner of accessing data in the hard disk in the related technology.

In addition, because the logical unit internally stores data in the append-only write manner, each time the hard disk stores data, the hard disk stores the data in an idle storage space. Therefore, each data storage process does not change stored historical data. In this way, even if the hard disk processes data in a specific storage space for a plurality of times, because the data in the storage space does not change, a plurality of processing results are consistent. This avoids a case in which a plurality of processing results obtained by processing data in a specific storage space are inconsistent because newly stored data replaces historical data when data is stored in the hard disk for a plurality of times by using the data storage manner in the related technology.

In the foregoing embodiment, an example in which a logical unit in the controller is obtained through division based on a data storage request sent by the controller is used. Optionally, a logical unit in the hard disk may alternatively be obtained through division in advance. In this case, in step 401, the controller may allocate a specific logical unit to the target data from these logical units, and allocate an identifier of the logical unit to the target data as the target logical unit identifier. In addition, after receiving the data storage request, the hard disk may directly perform step 406 without a need of performing step 402, step 403, step 404, and step 405.

In the foregoing embodiment, an example in which the idle storage space in the logical unit corresponding to the target logical unit identifier is enough to store the target data and the target data can be successfully stored in the target storage space is used.

When the idle storage space in the logical unit corresponding to the target logical unit identifier is not enough to store the target data, or when the target data fails to be stored in the target storage space, the hard disk may set the logical unit corresponding to the target logical unit identifier to a state in which a write operation is disabled, and send a storage failure response including the target logical unit identifier to the controller such as to notify that the target data fails to be written into the logical unit corresponding to the target logical unit identifier. A condition for determining whether data fails to be stored in a storage space (for example, data storage duration is less than a duration threshold) may be preset in the hard disk. In a process in which the hard disk stores the target data in the target storage space, once the condition is met, it is considered that the target data fails to be stored in the target storage space.

When the hard disk sets the logical unit corresponding to the target logical unit identifier to the state in which the write operation is disabled, the storage space cannot support the write operation regardless of whether the logical unit corresponding to the target logical unit identifier includes the idle storage space. Subsequently, if the controller sends the data storage request including the target logical unit identifier again, the hard disk needs to send the storage failure response to the controller. When the storage space is set to the state in which the write operation is disabled, the storage space does not support the write operation, but the storage space may support a read operation (reading data in the storage space) and a deletion operation (deleting data in the storage space).

In addition, the hard disk records each logical unit in which successfully stored data is located. If the controller subsequently needs to access these logical units, the hard disk may feed back data in these logical units to the controller. However, if a logical unit accessed by the controller is not in these logical units, the hard disk considers the access as invalid access, and feeds back an access failure response to the controller.

In the data access method provided in this embodiment of this disclosure, the controller may not only control the hard disk to store data, but also control the hard disk to delete data in a logical unit.

For example, when determining that data in the logical unit corresponding to the target logical unit identifier is to-be-deleted data, the controller may send a data deletion request including the target logical unit identifier to the hard disk. After receiving the data deletion request, the hard disk needs to determine whether the data in the logical unit corresponding to the target logical unit identifier is stopped being processed currently. When all data in the logical unit is stopped being processed, the hard disk may delete the data in the logical unit. Then, the hard disk may send a data deletion response including the target logical unit identifier to the controller such as to notify the controller that the data in the logical unit corresponding to the target logical unit identifier has been deleted. After receiving the data deletion response, the controller further needs to delete a locally recorded correspondence including the target logical unit identifier (for example, the correspondence between the target data, the target logical unit identifier, and the location information that is recorded in step 409).

If specific data is still being processed when the data is deleted, a data processing result is different from a real result, and accuracy of the data processing result is affected. Because data is stopped being processed when the hard disk in this embodiment of this disclosure deletes the data, accuracy of a data processing result is not affected.

When deleting the data in the logical unit corresponding to the target logical unit identifier, the hard disk may further delete the target logical unit identifier and the corresponding logical unit that are in the correspondence between a logical unit identifier and a logical unit such as to release a storage space corresponding to the logical unit. In addition, the hard disk may first delete the target logical unit identifier and the corresponding logical unit in the correspondence between a logical unit identifier and a logical unit, and then delete the data in the logical unit. This avoids a case in which the logical unit corresponding to the target logical unit identifier is recorded in the correspondence but the data in the logical unit is deleted.

In addition, when determining that some data in the logical unit is to-be-deleted data, the controller may delete only recorded information related to the data. However, the controller does not deliver the data deletion request to the hard disk such that the data stored in the hard disk is still stored.

Figure 6:
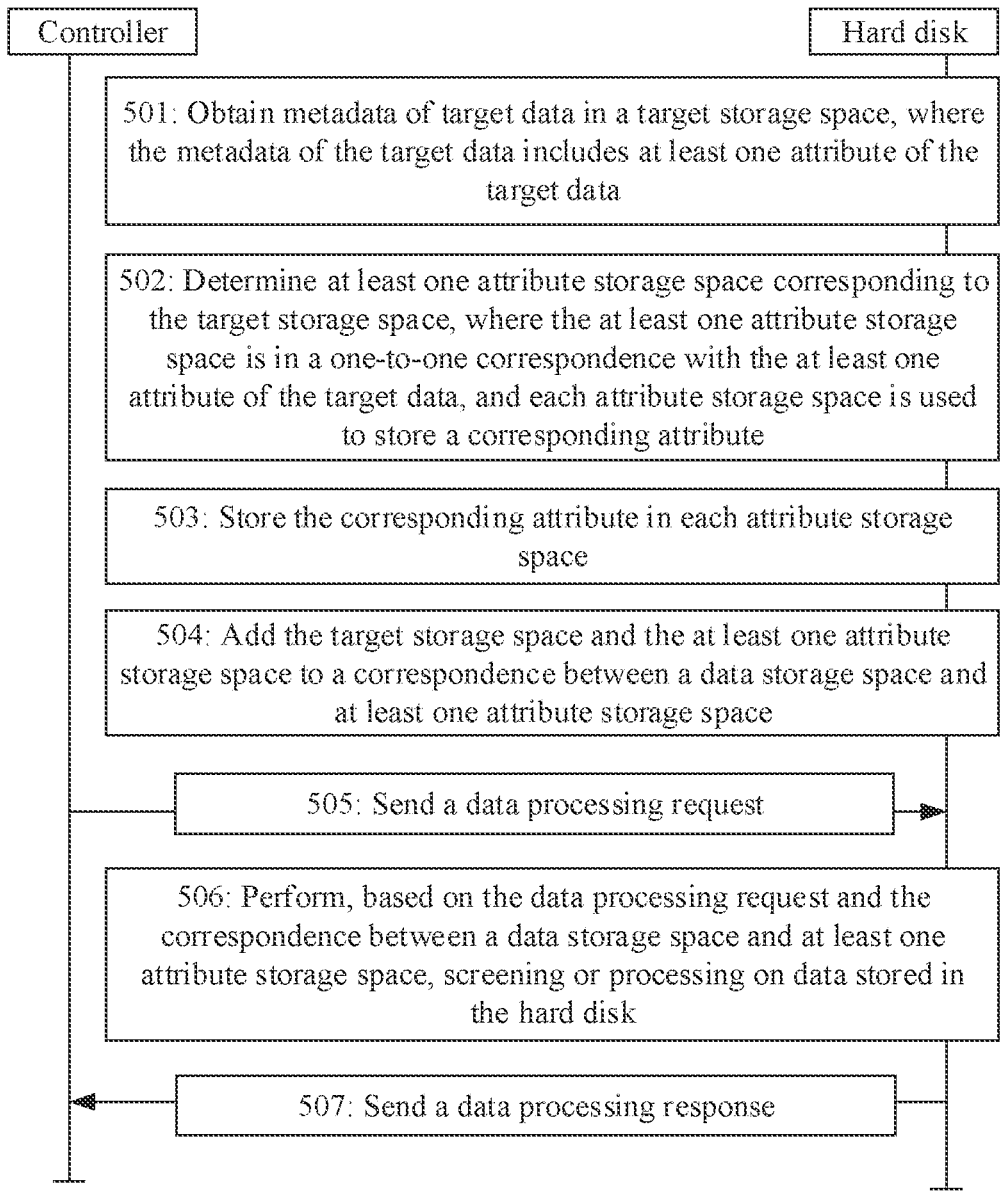
FIG. 6 is a flowchart of another data access method according to an embodiment of this disclosure.

Further, the hard disk provided in this embodiment of this disclosure can store not only data but also metadata of the data. Based on this, an embodiment of this disclosure provides another data access method shown in FIG. 6. As shown in FIG. 6, the data access method may further include the following steps.

Step 501: A hard disk obtains metadata of target data in a target storage space, where the metadata of the target data includes at least one attribute of the target data.

In this embodiment of this disclosure, the hard disk may obtain the metadata of the target data in a plurality of manners. For example, the hard disk may process locally stored target data to obtain metadata of the target data. Alternatively, the hard disk may receive a metadata storage request (including the metadata of the target data) sent by a controller, and obtain the metadata based on the metadata storage request.

Step 502: The hard disk determines at least one attribute storage space corresponding to the target storage space, where the at least one attribute storage space is in a one-to-one correspondence with the at least one attribute of the target data, and each attribute storage space is used to store a corresponding attribute.

The metadata of the target data includes the at least one attribute of the target data. In step 502, the hard disk needs to determine the attribute storage space used to store each attribute.

Optionally, the hard disk may determine the attribute storage space using any method. This is not limited in this embodiment of this disclosure. For example, the hard disk may determine the attribute storage space in a logical unit in which the target data is located, or the hard disk may determine the attribute storage space in an idle storage space other than storage spaces corresponding to all logical units. When the hard disk determines the attribute storage space in the idle storage space other than the storage spaces corresponding to all the logical units, a storage space provided by the hard disk is divided into two parts. The first part includes a logical unit used to store data, and the second part is a logical unit used to store metadata. When determining the foregoing target storage space in the first part, the hard disk may determine the foregoing attribute storage space in the second part. The hard disk may determine the attribute storage space in the second part with reference to the foregoing manner of determining the target storage space.

Step 503: The hard disk stores the corresponding attribute in each attribute storage space.

Step 504: The hard disk adds the target storage space and the at least one attribute storage space to a correspondence between a data storage space and at least one attribute storage space.

The hard disk may record the correspondence between a data storage space and at least one attribute storage space. Each attribute storage space in the correspondence is used to store an attribute of data in a corresponding data storage space.

After determining the at least one attribute storage space, the hard disk may add the target storage space and the at least one attribute storage space to the correspondence between a data storage space and at least one attribute storage space. The target storage space is used as a data storage space in the correspondence, and is used to store the target data. The attribute storage space is used as an attribute storage space in the correspondence, and is used to store an attribute of the target data.

For example, it is assumed that, before step 501, the foregoing correspondence between a data storage space and at least one attribute storage space is shown in Table 5. It is assumed that the foregoing target storage space is 1.5, the at least one attribute storage space includes 2.5 and 3.5, an attribute recorded by the attribute storage space 2.5 is the same as an attribute recorded by a first attribute storage space, and an attribute recorded by the attribute storage space 3.5 is the same as an attribute recorded by a second attribute storage space. Then, as shown in Table 6, the hard disk may add the target storage space 1.5, the attribute storage space 2.5, and an attribute storage space 3.5 to Table 5.

TABLE 5

| Data storage space | First attribute storage space | Second attribute storage space |
|---|---|---|
| 1.1 | 2.1 | 3.1 |
| 1.2 | 2.2 | 3.2 |
| 1.3 | 2.3 | 3.3 |
| 1.4 | 2.4 | 3.4 |

TABLE 6

| Data storage space | First attribute storage space | Second attribute storage space |
|---|---|---|
| 1.1 | 2.1 | 3.1 |
| 1.2 | 2.2 | 3.2 |
| 1.3 | 2.3 | 3.3 |
| 1.4 | 2.4 | 3.4 |
| 1.5 | 2.5 | 3.5 |

Step 505: The controller sends a data processing request to the hard disk.

Optionally, the data processing request includes the at least one attribute included in the metadata of the target data.

For example, the controller may send the data processing request to an interface in the hard disk. The interface in the hard disk has a metadata semantic meaning. Therefore, after receiving the data processing request, the interface in the hard disk can identify the foregoing at least one attribute included in the data processing request. The at least one attribute may be some or all of the attributes of the metadata.

For example, the data processing request sent by the controller may have a plurality of fixed locations, and each fixed location is used to carry one attribute. The interface in the hard disk may identify each fixed location in the data processing request to determine an attribute carried in the fixed location.

Step 506: The hard disk performs, based on the data processing request and the correspondence between a data storage space and at least one attribute storage space, screening or processing on data stored in the hard disk.

The data processing request may be used to indicate the hard disk to perform screening or processing on any data. The following uses four cases as examples for description.

It is assumed that each piece of data stored in the hard disk is each clip of video surveillance, and metadata of each clip includes two attributes. The first attribute is a time attribute (used to indicate a photographing time of the clip), and the second attribute is an address attribute (used to indicate a photographing address of the clip). A correspondence between data, a time attribute, and an address attribute is shown in Table 7.

TABLE 7

| Data | Time attribute | Address attribute |
|---|---|---|
| Clip 1 | 1:00 to 2:00 | Address 1 |
| Clip 2 | 2:00 to 3:00 | Address 1 |
| Clip 3 | 3:00 to 4:00 | Address 1 |
| Clip 4 | 3:00 to 4:00 | Address 2 |
| Clip 5 | 3:00 to 4:00 | Address 3 |

(1) The data processing request is used to indicate to find a clip having a specific time attribute. In this case, the data processing request includes the specific time attribute. After receiving the data processing request, the hard disk may read each time attribute storage space (used to store a time attribute) such as to obtain, through screening, at least one attribute storage space used to store the specific time attribute. Finally, the hard disk searches for, based on the correspondence between a data storage space and at least one attribute storage space, a clip in the data storage space corresponding to the at least one attribute storage space, and uses each found clip as a clip having the specific time attribute.

Table 7 is used as an example. Assuming that the specific time attribute is 1:00 to 3:00, the hard disk may determine, after the foregoing screening process, that the clip 1 and the clip 2 each are a clip having the specific time attribute.

(2) The data processing request is used to indicate to search for a clip having a specific time attribute and a specific address attribute. In this case, the data processing request needs to include the specific time attribute and the specific address attribute. After receiving the data processing request, the hard disk may read each time attribute storage space (used to store a time attribute) and each address attribute storage space (used to store an address attribute) such as to obtain, through screening, at least one time attribute storage space used to store the specific time attribute and at least one address attribute storage space used to store the specific address attribute. Finally, the hard disk searches for, based on the correspondence between a data storage space and at least one attribute storage space, a data storage space simultaneously corresponding to the at least one time attribute storage space and the at least one address attribute storage space, and uses a found clip in the data storage space as a clip having the specific time attribute and the specific address attribute.

Table 7 is used as an example. Assuming that the specific time attribute is 3:00 to 4:00, and the specific address attribute is an address 1, the hard disk may determine, after the foregoing screening process, that the clip 3 is a clip having the specific time attribute and the specific address attribute.

(3) The data processing request is used to indicate to identify a specific clip and determine a time attribute and an address attribute of the specific clip. In this case, the data processing request needs to carry an image feature of a specific clip. After receiving the data processing request, the hard disk may detect whether a clip in each data storage space has the image feature, and identify that a clip having the image feature is the specific clip. Finally, the hard disk searches for, based on the correspondence between a data storage space and at least one attribute storage space, a time attribute storage space and an address attribute storage space that correspond to a data storage space in which the specific clip is located, uses an attribute stored in the time attribute storage space as a time attribute of the specific clip, and uses an attribute stored in the address attribute storage space as an address attribute of the specific clip.

Table 7 is used as an example. Assuming that the identified specific clip is the clip 1, the hard disk may determine, based on the correspondence between a data storage space and at least one attribute storage space, that a time attribute of the clip 1 is 1:00 to 2:00, and an address attribute of the clip 1 is the address 1.

(4) The data processing request is used to indicate to identify a license plate number in each clip and delineate a moving track of a vehicle of a specific license plate number. In this case, the data processing request needs to carry the specific license plate number, and an indication of a time attribute and an address attribute. After receiving the data processing request, the hard disk may first identify a license plate number in a clip in each data storage space. Then, the hard disk may add a license plate number attribute storage space (used to store a license plate number attribute) to the correspondence between a data storage space and at least one attribute storage space, and store the license plate number in the clip in each data storage space as a license plate number attribute in the license plate number attribute storage space corresponding to the data storage space. Subsequently, the hard disk needs to search each license plate number attribute storage space for at least one license plate number attribute storage space in which a stored license plate number attribute is the same as the foregoing specific license plate number, and determine the moving track of the vehicle of the specific license plate number based on the attribute in the time attribute storage space and the address attribute storage space that correspond to the data storage space corresponding to the at least one license plate number attribute storage space.

Table 7 is used as an example. It is assumed that, after license plate number identification is performed on each clip, it is determined that a license plate number in each of the clips 1, 2, and 4 is a license plate number 1, and a license plate number in each of the clips 3 and clip 5 is a license plate number 2. In this case, as shown in Table 8, the hard disk may store these license plate numbers as license plate number attributes in the license plate number attribute storage space corresponding to each data storage space. If the foregoing specific license plate number is the license plate number 1, the hard disk may determine that the license plate number attribute of each of the clips 1, 2, and 4 is the same as the specific license plate number, and the hard disk may further determine the moving track of the vehicle of the specific license plate number based on the time attribute and the address attribute of each of the clips 1, 2, and 4. For example, the moving track is: The vehicle is always staying at the address 1 in 1:00 to 3:00, and moves from the address 1 to the address 2 in 3:00 to 4:00.

TABLE 8

| Data | Time attribute | Address attribute | License plate number attribute |
|---|---|---|---|
| Clip 1 | 1:00 to 2:00 | Address 1 | License plate number 1 |
| Clip 2 | 2:00 to 3:00 | Address 1 | License plate number 1 |
| Clip 3 | 3:00 to 4:00 | Address 1 | License plate number 2 |
| Clip 4 | 3:00 to 4:00 | Address 2 | License plate number 1 |
| Clip 5 | 3:00 to 4:00 | Address 3 | License plate number 2 |

It may be learned from the foregoing several types of processing that the hard disk can perform screening or processing on stored data, for example, perform data screening based on at least one attribute, determine the at least one attribute of the data; process the data to obtain the at least one attribute, and obtain a rule of some attributes based on some other attributes of the data (for example, obtain a moving rule of a license plate number attribute based on a time attribute and an address attribute).

Optionally, the foregoing data processing request may include not only at least one attribute but also a logical unit identifier. In this case, the hard disk may first search for a storage space based on the logical unit identifier, and then perform screening or processing on data in the found storage space based on the at least one attribute carried in the data processing request. For the screening or processing process, refer to the foregoing embodiment. Details are not described herein again in this embodiment of this disclosure.

Step 507: The hard disk sends a data processing response to the controller.

After completing the foregoing data processing, the hard disk may add a data processing result to the data processing response and send the data processing response to the controller.

It may be learned that, in the data access method provided in this embodiment of this disclosure, the hard disk can assist the controller in performing some data processing, and the hard disk stores the at least one attribute of the metadata. In a process in which the hard disk performs data processing, the hard disk does not need to interact with the controller to obtain an attribute of the metadata. This reduces interaction between the hard disk and the controller in a data processing process, and improves efficiency of performing data processing by the hard disk.

In addition, the hard disk in this embodiment of this disclosure can delete data in a logical unit. Correspondingly, when deleting the data in the logical unit, the hard disk may further delete an attribute in at least one attribute storage space corresponding to a data storage space of the logical unit, and the data storage space and the corresponding attribute storage space of the logical unit in the correspondence between a data storage space and at least one attribute storage space. In addition, the hard disk may first delete the attribute, and the data storage space and the attribute storage space that are in the correspondence between a data storage space and at least one attribute storage space, and then delete the data in the logical unit. This avoids a case in which an attribute of specific data is stored in the hard disk but the data has been deleted.

For corresponding hard disk embodiments and storage device embodiments, refer to the method embodiments provided in the embodiments of this disclosure. This is not limited in the embodiments of this disclosure. A sequence of the steps of the method embodiments provided in the embodiments of this disclosure can be properly adjusted, and the steps can be correspondingly added or deleted based on a situation.

It should be understood that "at least one" mentioned in this specification means one or more, and "a plurality of" means two or more.

What is claimed is:

1. A hard disk comprising:
a storage medium configured to provide a first storage space and store metadata of data, wherein the first storage space comprises a plurality of logical units, wherein each of the logical units comprises a different logical unit identifier, and wherein each of the logical units is configured to store the data in an append-only write manner;
an interface coupled to the storage medium and configured to:
communicate with a controller;
provide, to the controller, a first logical unit identifier and the metadata;
receive, from the controller, a data access request comprising the first logical unit identifier; and
receive, from the controller, a data processing request comprising a second logical unit identifier and at least one attribute comprised in the metadata; and
a processor coupled to the storage medium and the interface, and configured to:
search for the first storage space based on the first logical unit identifier and in response to the data access request;
search for a second storage space based on the second logical unit identifier; and
perform screening or processing on second data in the second storage space based on the at least one attribute,
wherein the interface is further configured to receive, from the controller, a data deletion request comprising a third logical unit identifier, wherein the processor is further configured to:
search for a second storage space of to-be-deleted data based on the third logical unit identifier;
determine whether the second data in the second storage space is currently being processed;
monitor until processing of all data in the second storage space has stopped before deleting the second data when the second data is still being processed;
send, by the interface, a deletion failure response to the controller when the processing has not stopped and deletion cannot proceed; and
delete the second data in the second storage space when the processing has stopped, and
wherein the interface is further configured to send, to the controller, a data deletion response comprising the third logical unit identifier.

2. The hard disk of claim 1, wherein the metadata comprises one or more attributes of the data.

3. The hard disk of claim 1, wherein the interface is further configured to provide, to the controller, a data storage space offset of a logical unit, wherein the data access request further comprises the data storage space offset, and wherein the processor is further configured to search for the first storage space based on the first logical unit identifier and the data storage space offset.

4. The hard disk of claim 1, wherein a storage space corresponding to each logical unit is from one or more erase blocks in the hard disk, and wherein the erase blocks are minimum erase units of the hard disk.

5. The hard disk of claim 4, wherein a quantity of the erase blocks is an integer.

6. The hard disk of claim 4, wherein a quantity of the erase blocks is a fraction.

7. A storage device comprising:
a controller; and
a hard disk coupled to the controller and configured to:
provide a first storage space comprising a plurality of logical units, wherein each of the logical units comprises a different logical unit identifier, and wherein each of the logical units is configured to store data in an append-only write manner;
store metadata of the data;
communicate with the controller; and
provide, to the controller, a first logical unit identifier and the metadata,
wherein the controller is configured to:
send, to the hard disk, a data access request comprising the first logical unit identifier; and
send, to the hard disk, a data processing request comprising a second logical unit identifier and an attribute comprised in the metadata,
wherein the hard disk is further configured to:
search for the first storage space based on the first logical unit identifier and in response to the data access request;
search for a second storage space based on the second logical unit identifier; and
perform screening or processing on second data in the second storage space based on the attribute,
wherein the controller is further configured to send, to the hard disk, a data deletion request comprising a third logical unit identifier,
wherein the hard disk is further configured to:
determine whether the second data in the second storage space is currently being processed;
monitor until processing of all data in the second storage space has stopped before deleting the second data when the second data is still being processed;
send, by the interface, a deletion failure response to the controller when the processing has not stopped and deletion cannot proceed; and
delete the second data in the second storage space when the processing has stopped, and
wherein the controller is further configured to receive a data deletion request comprising a third logical unit identifier.

8. The storage device of claim 7, wherein the metadata comprises one or more attributes of the data.

9. The storage device of claim 7, wherein the data access request further comprises a data storage space offset, and wherein the hard disk is further configured to:
provide, to the controller, the data storage space offset of a logical unit; and
search for first storage space based on the first logical unit identifier and the data storage space offset.

10. The storage device of claim 7, wherein a storage space corresponding to each logical unit is from one or more erase blocks in the hard disk, and wherein the erase blocks are minimum erase units of the hard disk.

11. The storage device of claim 10, wherein a quantity of the erase blocks is an integer.

12. The storage device of claim 10, wherein a quantity of the erase blocks is a fraction.

13. A method comprising:
providing, by a hard disk, a first storage space comprising a plurality of logical units, wherein each of the logical units comprises a different logical unit identifier, and wherein each of logical units is configured to store data in an append-only write manner;
storing, by the hard disk, metadata of the data;
providing, by the hard disk to a controller, a first logical unit identifier and the metadata;
sending, by the controller to the hard disk, a data access request comprising the first logical unit identifier;
searching for, by the hard disk, the first storage space based on the first logical unit identifier;
sending, by the controller to the hard disk, a data processing request comprising a second logical unit identifier and at least one attribute of comprised in the metadata;
searching for, by the hard disk, a second storage space based on the second logical unit identifier;
performing screening or processing on second data in the second storage space based on the at least one attribute;
sending, by the controller to the hard disk, a data deletion request comprising a third logical unit identifier;
searching, by the hard disk, for a second storage space of to-be-deleted data based on the third logical unit identifier;
determining, by the hard disk, whether the second data in the second storage space is currently being processed;
monitoring, by the hard disk, until processing of all data in the second storage space has stopped before deleting the second data when the second data is still being processed;
sending, by the interface, a deletion failure response to the controller when the processing has not stopped and deletion cannot proceed;
deleting, by the hard disk, the second data in the second storage space when the processing has stopped; and
sending, by the hard disk to the controller, a data deletion response comprising the third logical unit identifier.

14. The method of claim 13, wherein the metadata comprises one or more attributes of the data.

15. The method of claim 13, wherein before sending the data access request, the method further comprises providing, by the hard disk to the controller, a data storage space offset of a logical unit, wherein the data access request further comprises the data storage space offset, and wherein searching the first storage space comprises searching for, by the hard disk, the first storage space based on the first logical unit identifier and the data storage space offset.

16. The method of claim 13, wherein a storage space corresponding to each logical unit is from one or more erase blocks in the hard disk, and wherein the erase blocks are minimum erase units of the hard disk.

17. The method of claim 16, wherein a quantity of the erase blocks is an integer.

18. The method of claim 16, wherein a quantity of the erase blocks is a fraction.

* * * * *